S. D. HOPKINS.
Sowers, Planters, and Cultivators.
No. 144,099.  Patented Oct. 28, 1873.
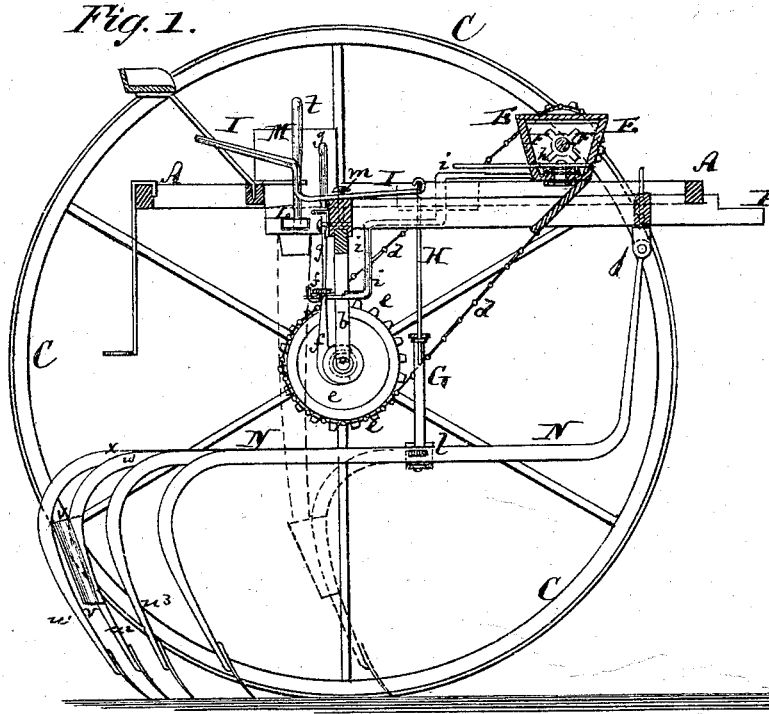
Fig. 1.
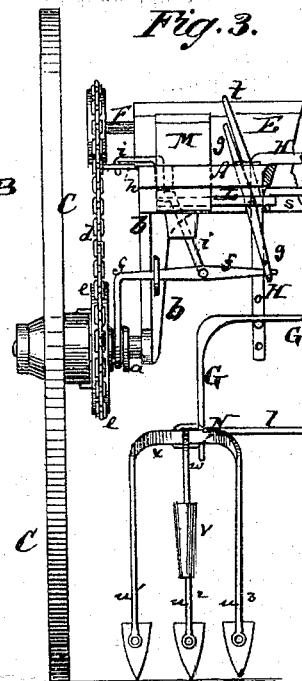
Fig. 3.
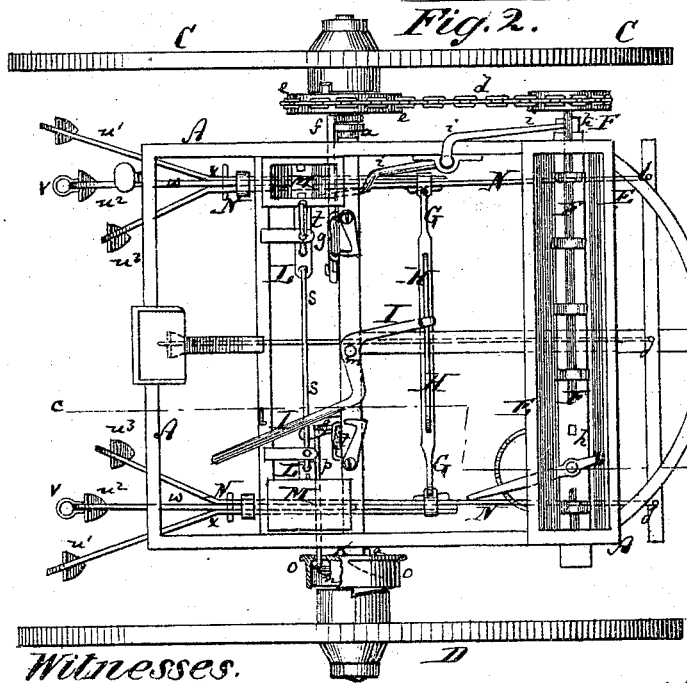
Fig. 2.
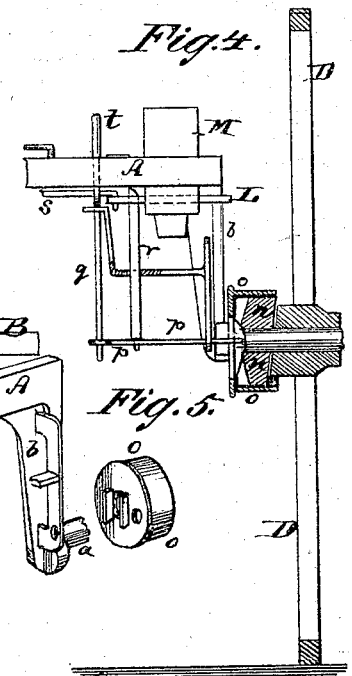
Fig. 4.
Fig. 5.
Witnesses.
John Becker
Fred Haynes
S. D. Hopkins
per Wales, Brown & Allen
Attorneys

UNITED STATES PATENT OFFICE.

SQUIRE D. HOPKINS, OF MILFORD, KANSAS.

IMPROVEMENT IN SOWERS, PLANTERS, AND CULTIVATORS.

Specification forming part of Letters Patent No. 144,099, dated October 28, 1873; application filed February 27, 1873.

*To all whom it may concern:*

Be it known that I, SQUIRE D. HOPKINS, of Milford, in the county of Riley and State of Kansas, have invented an Improved Sower, Planter, and Cultivator, of which the following is a specification:

The invention consists in a new arrangement of parts for giving a vertical as well as lateral play to the plows or shovels used in the cultivator; also, in arranging the plows in groups, three in each group, the middle plow and the one next the wheel being adjustable, for the purposes hereinafter more fully set out.

In the accompanying drawing, Figure 1 represents a vertical longitudinal section of my improved apparatus, the line $c\, c$, Fig. 2, indicating the plane of section. Fig. 2 is a plan or top view of the same; Fig. 3, a detail rear elevation of one side of the same; Fig. 4, a rear elevation, partly in section, of the other side thereof; and Fig. 5, a detail perspective view of one of the driving-wheels and the ratchet-wheel-inclosing sleeve.

Similar letters of reference indicate corresponding parts.

The letter A represents the upper framework of my improved cultivating and seeding machine, which connects with the tongue B in suitable manner, and is supported by two driving-wheels, C and D, which are hung on pins $a$, that extend outward from the downwardly-projecting brackets of the frame A. E is a box placed transversely upon the front portion of the frame A. It is intended for the reception of grain or other matter to be sowed, and may also be used for distributing guano or other fertilizing substance. In this box is hung a shaft, F, which carries projecting arms or stirring devices of suitable kind. By means of a belt or chain, $d$, the said shaft F is revolved by a toothed wheel or pulley, $e$, which connects with the driving-wheel C. The wheel $e$ is connected, by a rod, $f$, with a lever, $g$, and can, by means of said lever, be thrown into or out of connection with the driving-wheel C, to revolve or stop the rotation of the shaft F. On the bottom of the box E, which is perforated, are placed two sliding plates, which are also perforated to promote the discharge of the grain downward. One of these plates $h$ connects, by an elbow-crank, $i$, with the rod $f$, in such manner that when the lever $g$ is moved it will throw the wheel out of gear. The elbow-crank $i$ will at the same time draw the plate $h$ so as to stop the seed-passages of the box E, and arrest the further discharge of the grain therefrom. N N are a series of plow-beams, carrying plows or shovels of suitable construction, and pivoted at their upwardly-bent forward ends, at $j$, to the front portion of the frame A.

The several beams N N are connected transversely by a bar, $l$, and by an inverted U-shaped frame, G, of which portion is clearly shown in Fig. 3. The frame G connects with the standards of an inverted U-shaped yoke, H, which yoke, at its upper part, is joined to the front end of a lever, I, that is pivoted, by a pin or joint, $m$, to the top of the frame A. The standards of the yoke H are perforated to admit the up-and-down adjustment of the plow-beams for the purpose of regulating the depth to which they enter the soil. By means of the lever I the yoke can, however, be raised and lowered for the purpose of raising the plows out of the ground altogether, and lowering them into the ground at will; and, by the same lever I, the yoke, with its appended plow-beams, can be moved laterally for regulating the position of the plows in suitable manner. The driving-wheel D has ratchet-teeth formed on its hub, that engage with the teeth of a ratchet-disk, $n$, held in an embracing-sleeve, $o$, as shown. The inner face of the disk $n$ has alternate depressions and projections, as in Fig. 2, and is in contact with a pin, $p$, held against it by a spring, $q$. During the backward motion the wheel will slip on the disk $n$, but will turn the same on moving forward, and thereby vibrate the pin $p$ and a lever, $r$, with which such pin is connected. The upper end of $r$ connects with the perforated sliding bottom L of the seed-box, and gives motion to the same. The frame A carries two seed-boxes, M M, the slides L of both being united by a rod, S, to obtain simultaneous and equal motion. By a handle, $t$, on the spring-rod $q$, the pin $p$ may be thrown out of contact with $n$, to arrest the motion of the slides L. Under each box M is a plow-beam, N, carrying three plows, $w^1 w^2 w^3$. When the sower E is used, these plows stand as in Fig. 2; but when the sower is disconnected, and the slides L L are set in motion for planting, the middle plow, $w^2$, and the plow next to the wheel of each group are moved forward, so that the middle plow will be forward of the other two, which are then in line with each other. The middle plow, $w^2$, has a tubular attachment, $v$, at the back of its standard, into which a discharge-hose from the seed-box M is carried, as indicated by dotted lines in Fig. 1. The plow $w^2$ will thus be forward of the seed-discharge, and serve as furrow-opener, the other two plows, $w^1$ and $w^3$, being furrow-closers. The adjustability of the plows $w^2$ and $w^1$ of each group is obtained by attaching to them short beams $w$ and $x$, respectively, and placing them alongside of the main beam N, to which the other plow $w^3$ is attached. Transverse pins connect these three beams N, $w$, and $x$, and allow them to be shifted in the desired manner. When the machine is to be used as a planter or cultivator, the plow not included in the groups named should be removed, which can be readily done.

What is here claimed, and desired to be secured by Letters Patent, is—

1. The combination of plow-yoke H, frame G, plow-beams N N, and lever I, when arranged and operating as shown and described.

2. The combination, with each other, of the three plows $w^1$ $w^2$ $w^3$ in one group, when the middle plow, $w^2$, is made movable lengthwise between the other, as set forth.

SQUIRE D. HOPKINS.

Witnesses:
A. V. BRIESEN,
FRED. HAYNES.